US010524198B2

(12) United States Patent
Shan et al.

(10) Patent No.: US 10,524,198 B2
(45) Date of Patent: Dec. 31, 2019

(54) UE INDICATION TO PCF WHETHER OR NOT TO SEND UE POLICY

(71) Applicant: Intel Corporation, Santa Clara, CA (US)

(72) Inventors: Chang Hong Shan, Portland, OR (US); Robert Zaus, München (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/411,701

(22) Filed: May 14, 2019

(65) Prior Publication Data

US 2019/0268835 A1 Aug. 29, 2019

Related U.S. Application Data

(60) Provisional application No. 62/673,544, filed on May 18, 2018, provisional application No. 62/674,469, filed on May 21, 2018, provisional application No. 62/675,318, filed on May 23, 2018.

(51) Int. Cl.
*H04W 48/16* (2009.01)
*H04W 48/08* (2009.01)

(52) U.S. Cl.
CPC .......... *H04W 48/16* (2013.01); *H04W 48/08* (2013.01)

(58) Field of Classification Search
CPC ............................. H04W 48/16; H04W 48/08
See application file for complete search history.

(56) References Cited

U.S. PATENT DOCUMENTS

2019/0174449 A1* 6/2019 Shan ................... H04W 60/04
2019/0254094 A1* 8/2019 Babu .................. H04W 76/15

OTHER PUBLICATIONS

S2-185166-TSG-SA WG2 Meeting #127BIS Newport Beach, U.S., May 28-Jun. 1, 2018 (Year: 2018).*

* cited by examiner

*Primary Examiner* — German Viana Di Prisco
(74) *Attorney, Agent, or Firm* — Spectrum IP Law Group LLC

(57) ABSTRACT

An apparatus of a user equipment (UE) comprises one or more baseband processors to encode a UE capability indicator to be transmitted to a policy control function (PCF) via an Access and Mobility Management Function (AMF), wherein the UE capability indicator indicates whether the UE supports or does not support a preconfigured UE policy comprising access network discovery and selection policy (ANDSP) or UE route selection policy (URSP), or both. The apparatus of a UE further can comprise a memory to store the UE capability indicator.

20 Claims, 6 Drawing Sheets

UE INDICATION TO PCF WHETHER OR NOT TO SEND UE POLICY

CROSS-REFERENCE TO RELATED APPLICATIONS

The present application claims the benefit of U.S. Application No. 62/673,544) filed May 18, 2018, Application No. 62/674,469 filed May 21, 2018, and Application No. 62/675,318 filed May 23, 2018. Said Application No. 62/673,544, said Application No. 62/674,469, and said Application No. 62/675,318 are hereby incorporated herein by reference in their entireties.

BACKGROUND

According to the current design in the Third Generation Partnership Project (3GPP) Technical Specification (TS) 23.503, if Policy and Charging Control (PCC) is deployed, the user equipment (UE) Policy comprising access network discovery and selection policy (ANDSP) and UE route selection policy (URSP) will be blindly sent to UE by the Policy Control Function (PCF). Blinding sending the UE policy can cause unnecessary non-access stratum (NAS) signaling and unnecessary UE implementation for a feature that is not supported, namely ANDSP and/or URSP, for the following two cases. First, support of non-3GPP access is optional. As a result, support of ANDSP provisioning via signaling also must be optional. Second, for a simple Fifth Generation (5G) UE which is only intended to be used for enhanced Mobile Broadband (eMBB), the URSP can be pre-configured as stated in 3GPP TS 23.503. URSP provisioning via signaling should be optional because the provisioning via signaling is completely over-engineered.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
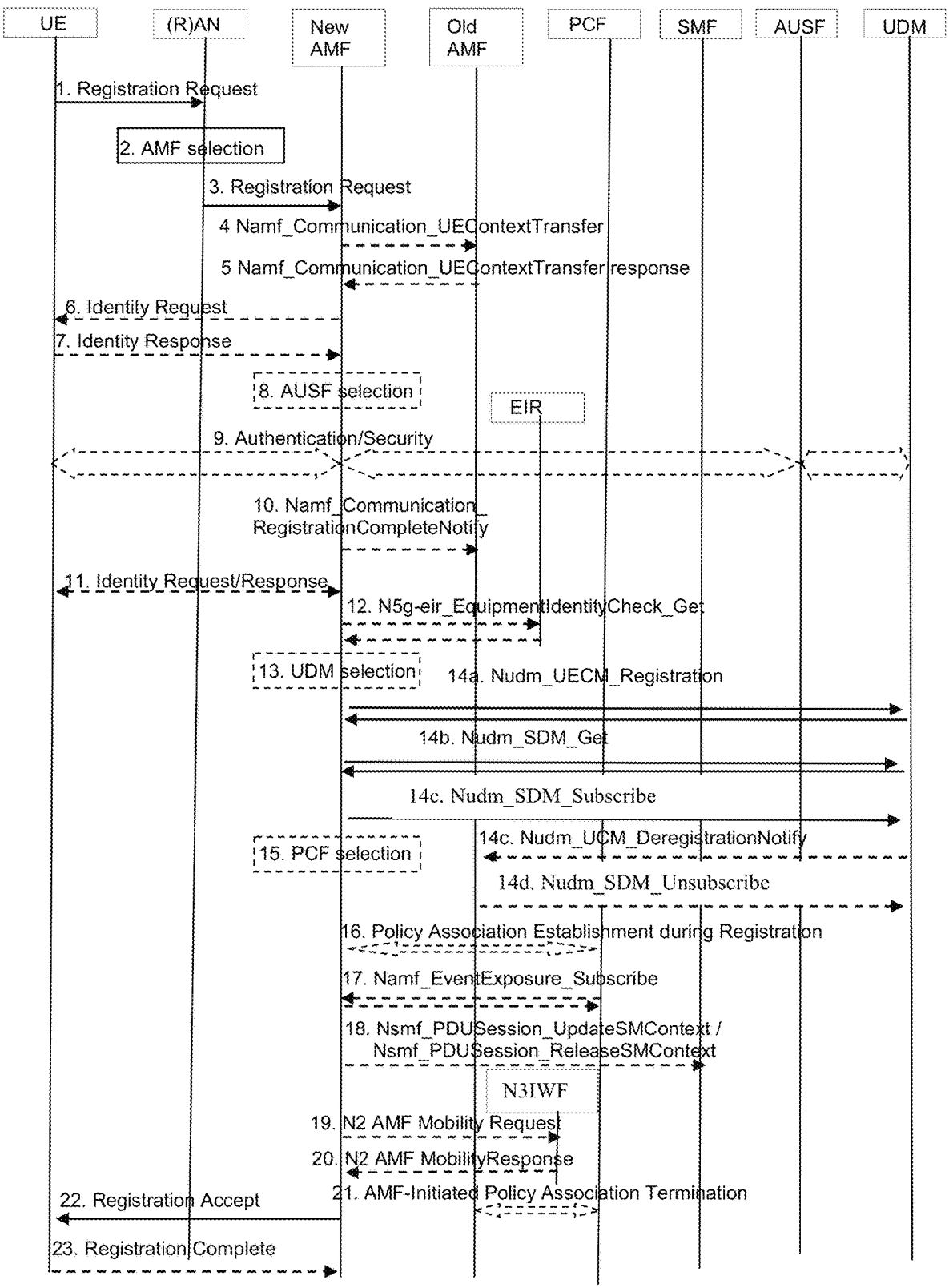
FIG. 1 is a diagram of an initial registration procedure in which an uplink transmission is lost in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an initial registration procedure in which an uplink transmission is lost in accordance with one or more embodiments will be discussed. In the initial Registration Request, the user equipment (UE) may indicate to the policy control function (PCF) via the Access and Mobility Management Function (AMF) whether it only supports preconfigured access network discovery and selection policy (ANDSP) or UE route selection policy (URSP) or both, whether it does not support ANDSP or URSP, or whether it supports URSP and ANDSP provisioned by the PCF. According to the corresponding indication, the PCF decides whether or not to send the UE Policy (ANDSP, URSP) to the UE.

This indication can be achieved by defining a new indicator or setting one or more the Policy Session Identifiers (PSIs) in the list of PSIs to a specific value or values. For example, a PSI value of FFFF can indicate that the UE only supports preconfigured ANDSP or does not support ANDSP, whereas a value of FFFE can indicate that the UE supports ANDSP provisioned by PCF. In a similar way, a PSI value of FFEFE can indicate that the UE only support preconfigured URSP or does not support URSP, whereas a value of FFEE can indicate that the UE supports URSP provisioned by PCF. Note that the PSIs are used during initial registration to indicate to the PCF which UE policies provisioned by the PCF are currently stored in the UE.

In addition to the indications described above, other enhancements and/or indications are also possible. For example, by sending another specific PSI value (e.g. FF00), the UE could indicate to the PCF support of a 'higher' protocol version for communication between UE and PCF. Support of this higher protocol version could mean, for example that the UE is able to process a different format of the ANDSP or URSP which is not backwards compatible to the format defined in the first, earlier version of the protocol. A different format of a policy could mean for example that the policy includes additional parameters, or that the policy rules can have a different structure. Other specific PSI values could be used by the UE to indicate to the PCF support of configuration via signaling of other, additional UE policies (other than ANDSP and URSP). More generally, a certain value range, e.g. from FF00 to FFFF, could be reserved to be used for general signaling purposes, whereas the range from 0000 to FEFF could be reserved to be used to indicate the UE policies provisioned by the PCF and currently stored in the UE.

The general registration procedure defined in clause 4.2.2.2.2 and clause 4.16.1.2 of 3GPP TS 23.502 are shown below with the additions show by underlining.

1. UE to (R)AN: AN message (AN parameters, Registration Request (Registration type, SUCI or 5G-GUTI or PEI, last visited TAI (if available), Security parameters, Requested NSSAI, [Mapping Of Requested NSSAI], UE 5GC Capability, PDU Session status, List Of PDU Sessions To Be Activated, Follow on request, MICO mode preference, Requested DRX parameters, UE support of Request Type flag "handover" during the attach procedure) and the list of PSIs).

If the UE only supports preconfigured ANDSP/URSP, or it doesn't support ANDSP/URSP or it supports URSP/ANDSP provisioned by PCF, it indicates the corresponding capability to PCF via AMF (e.g. it uses specific PSI value(s) to indicate that accordingly).

In the case of NG-RAN, the AN parameters include e.g. SUCI or the 5G-GUTI, the Selected PLMN ID and Requested NSSAI, the AN parameters also include Establishment cause. The Establishment cause provides the reason for requesting the establishment of an RRC connection.

The Registration type indicates if the UE wants to perform an Initial Registration (i.e. the UE is in RM-DEREGISTERED state), a Mobility Registration Update (i.e. the UE is in RM-REGISTERED state and initiates a Registration procedure due to mobility or due to the UE needs to update its capabilities or protocol parameters), a Periodic Registration Update (i.e. the UE is in RM-REGISTERED state and initiates a Registration procedure due to the Periodic Registration Update timer expiry, see clause 4.2.2.2.1) or an Emergency Registration (i.e. the UE is in limited service state).

When the UE is performing an Initial Registration (i.e., the UE is in RM-DEREGISTERED state) to a PLMN for which the UE does not already have a 5G-GUTI, the UE shall include its SUCI in the Registration Request as defined in TS 33.501 [15]. If the UE previously received a UE Configuration Update Command indicating that the UE needs to re-register and that it shall not provide the 5G-GUTI in access stratum signalling when performing the Registration procedure, the UE performs a Mobility Registration and shall not include the 5G-GUTI in the AN parameters. For an Emergency Registration, the SUCI shall be included if the UE does not have a valid 5G-GUTI available; the PEI shall be included when the UE has no SUPI and no valid 5G-GUTI. In other cases, the 5G-GUTI is included and it indicates the last serving AMF. If the UE is already registered via a non-3GPP access in a PLMN different from the new PLMN (i.e. not the registered PLMN or an equivalent PLMN of the registered PLMN) of the 3GPP access, the UE shall not provide over the 3GPP access the 5G-GUTI allocated by the AMF during the Registration procedure over the non-3GPP access. Also, if the UE is already registered via a 3GPP access in a PLMN (i.e. the registered PLMN), different from the new PLMN (i.e. not the registered PLMN or an equivalent PLMN of the registered PLMN) of the non-3GPP access, the UE shall not provide over the non-3GPP access the 5G-GUTI allocated by the AMF during the Registration procedure over the 3GPP access.

The UE may provide the UE's usage setting based on its configuration as defined in TS 23.501 [2] clause 5.16.3.7. In case of Initial Registration or Mobility Registration Update, the UE includes the Mapping Of Requested NSSAI (if available), which is the mapping of each S-NSSAI of the Requested NSSAI to the S-NSSAIs of the Configured NSSAI for the HPLMN, to ensure that the network is able to verify whether the S-NSSAI(s) in the Requested NSSAI are permitted based on the Subscribed S-NSSAIs.

The UE includes an indication if it supports Request Type flag "handover" for PDN connectivity request during the attach procedure as defined in clause 5.17.2.3.1 of TS 23.501 [2]. If available, the last visited TAI shall be included in order to help the AMF produce Registration Area for the UE.

The Security parameters are used for Authentication and integrity protection, see TS 33.501 [15]. Requested NSSAI indicates the Network Slice Selection Assistance Information (as defined in clause 5.15 of TS 23.501 [2]). The PDU Session status indicates the previously established PDU Sessions in the UE. When the UE is connected to the two AMFs belonging to different PLMN via 3GPP access and non-3GPP access then the PDU Session status indicates the established PDU Session of the current PLMN in the UE. The PDU Session(s) to be re-activated is included to indicate the PDU Session(s) for which the UE intends to activate UP connections. A PDU Session corresponding to a LADN shall not be included in the PDU Session(s) to be re-activated when the UE is outside the area of availability of the LADN. The Follow on request is included when the UE has pending uplink signalling and the UE doesn't include PDU Session(s) to be re-activated, or the Registration type indicates the UE wants to perform an Emergency Registration. In Initial Registration and Mobility Registration Update, UE provides the UE Requested DRX parameters, as defined in clause 5.4.5 of TS 23.501 [2].

The UE MM Core Network Capability is provided and handled by AMF as defined in TS 23.501 [2] clause 5.3.4a.

The UE access selection and PDU session selection identifies the list of UE access selection and PDU session selection policy information stored in the UE, defined in clause 6.6 of TS 23.503 [20]. They are used by the PCF to determine if the UE has to be updated with new PSIs or if some of the stored ones are no longer applicable and have to be removed.

Editor's note: It is FFS how UE Radio capabilities are provided.

2. If a 5G-GUTI is not included or the 5G-GUTI does not indicate a valid AMF the (R)AN, based on (R)AT and Requested NSSAI, if available, selects an AMF.

The (R)AN selects an AMF as described in TS 23.501 [2], clause 6.3.5. If UE is in CM-CONNECTED state, the (R)AN can forward the Registration Request message to the AMF based on the N2 connection of the UE.

If the (R)AN cannot select an appropriate AMF, it forwards the Registration Request to an AMF which has been configured, in (R)AN, to perform AMF selection.

3. (R)AN to new AMF: N2 message (N2 parameters, Registration Request (as described in step 1) and UE access selection and PDU session selection information).

When NG-RAN is used, the N2 parameters include the Selected PLMN ID, Location Information, Cell Identity and the RAT type related to the cell in which the UE is camping.

When NG-RAN is used, the N2 parameters also include the Establishment cause.

Mapping Of Requested NSSAI is provided only if available.

If the Registration type indicated by the UE is Periodic Registration Update, then steps 4 to 20 may be omitted.

4. [Conditional] new AMF to old AMF: Namf_Communication_UEContextTransfer (complete Registration Request).

If the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, to request the UE's SUPI and MM Context. See clause 5.2.2.2.2 for details of this service operation. The old AMF uses the integrity protected complete Registration request NAS message to verify if the context transfer service operation invocation corresponds to the UE requested.

The old AMF also transfers the event subscriptions information by each NF consumer, for the UE, to the new AMF.

NOTE 2: The NF consumers does not need to subscribe for the events once again with the new AMF after the UE is successfully registered with the new AMF.

If the new AMF has already received UE contexts from the old AMF during handover procedure, then step 4,5 and 10 shall be skipped.

For an Emergency Registration, if the UE identifies itself with a 5G-GUTI that is not known to the AMF, steps 4 and 5 are skipped and the AMF immediately requests the SUPI from the UE. If the UE identifies itself with PEI, the SUPI request shall be skipped. Allowing Emergency Registration without a user identity is dependent on local regulations.

5. [Conditional] old AMF to new AMF: Response to Namf_Communication_UEContextTransfer (SUPI, UE Context in AMF (as per Table 5.2.2.2.2-1)).

Old AMF responds to the new AMF for the Namf_Communication_UEContextTransfer invocation by including the UE's SUPI and MM Context.

If old AMF holds information about established PDU Sessions, the old AMF includes SMF information DNN, S-NSSAI(s) and PDU Session ID.

If old AMF holds information about active NGAP UE-TNLA bindings to N3IWF, the old AMF includes information about the NGAP UE-TNLA bindings.

6. [Conditional] new AMF to UE: Identity Request ( ).

If the SUPI is not provided by the UE nor retrieved from the old AMF the Identity Request procedure is initiated by AMF sending an Identity Request message to the UE requesting the SUCI.

7. [Conditional] UE to new AMF: Identity Response ( ).

The UE responds with an Identity Response message including the SUCI. The UE derives the SUCI by using the provisioned public key of the HPLMN, as specified in TS 33.501 [15].

8. The AMF may decide to initiate UE authentication by invoking an AUSF. In that case, the AMF selects an AUSF based on SUPI or SUCI, as described in TS 23.501 [2], clause 6.3.4.

If the AMF is configured to support Emergency Registration for unauthenticated SUPIs and the UE indicated Registration type Emergency Registration, the AMF skips the authentication or the AMF accepts that the authentication may fail and continues the Registration procedure.

9a. Upon request from the AMF (via the Nausf_UEAuthentication_Authenticate operation), the AUSF shall execute authentication of the UE. The authentication is performed as described in TS 33.501 [15]. The AUSF discovers a UDM as described in TS 23.501 [2], clause 6.3.8 and gets the authentication data from UDM.

Once the UE has been authenticated the AUSF provides relevant security related information to the AMF. In case the AMF provided a SUCI to AUSF, the AUSF shall return the SUPI to AMF only after the authentication is successful.

If network slicing is used, the AMF decides if the Registration Request needs to be rerouted as described in clause 4.2.2.2.3, where the initial AMF refers to the AMF.

9b. The NAS security initiation is performed as described in TS 33.501 [15].

9c. Upon completion of NAS security function setup, the AMF initiates NGAP procedure to provide the 5G-AN with security context as specified in TS 38.413 [10].

9d. The 5G-AN stores the security context and acknowledges to the AMF. The 5G-AN uses the security context to protect the messages exchanged with the UE as described in TS 33.501 [15].

10. [Conditional] new AMF to old AMF: Namf_Communication_RegistrationCompleteNotify ( ).

If the AMF has changed the new AMF notifies the old AMF that the registration of the UE in the new AMF is completed by invoking the Namf_Communication_RegistrationCompleteNotify service operation.

If the authentication/security procedure fails, then the Registration shall be rejected, and the new AMF invokes the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationCompleteNotify service operation including the rejected PDU Session ID and a reject cause (e.g. the S-NSSAI becomes no longer available) towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

See clause 5.2.2.2.3 for details of Namf_Communication_RegistrationCompleteNotify service operation.

11. [Conditional] new AMF to UE: Identity Request/Response (PEI).

If the PEI was not provided by the UE nor retrieved from the old AMF the Identity Request procedure is initiated by AMF sending an Identity Request message to the UE to retrieve the PEI. The PEI shall be transferred encrypted unless the UE performs Emergency Registration and cannot be authenticated.

For an Emergency Registration, the UE may have included the PEI in the Registration Request. If so, the PEI retrieval is skipped.

12. Optionally the new AMF initiates ME identity check by invoking the N5g-eir_EquipmentIdentityCheck_Get service operation (see clause 5.2.4.2.2).

The PEI check is performed as described in clause 4.7.

For an Emergency Registration, if the PEI is blocked, operator policies determine whether the Emergency Registration procedure continues or is stopped.

13. If step 14 is to be performed, the new AMF, based on the SUPI, selects a UDM, then UDM may select a UDR instance. See TS 23.501 [2], clause 6.3.9.

The AMF selects a UDM as described in TS 23.501 [2], clause 6.3.8.

14a-b. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UEC-M_Registration and subscribes to be notified when the UDM deregisters this AMF. The UDM stores the AMF identity associated to the Access Type and does not remove the AMF identity associated to the other Access Type. The UDM may store information provided at registration in UDR, by Nudr_UDM_Update.

The AMF retrieves the Access and Mobility Subscription data, SMF Selection Subscription data and UE context in SMF data using Nudm_SDM_Get. This requires that UDM may retrieve this information from UDR by Nudr_UDM_Query. After a successful response is received, the AMF subscribes to be notified using Nudm_SDM_Subscribe when the data requested is modified, UDM may subscribe to UDR by Nudr_UDM_Subscribe. The GPSI is provided to the AMF in the Access and Mobility Subscription data from the UDM if the GPSI is available in the UE subscription data.

The new AMF provides the Access Type it serves for the UE to the UDM and the Access Type is set to "3GPP access". The UDM stores the associated Access Type together with the serving AMF in UDR by Nudr_UDM_Update.

The new AMF creates an MM context for the UE after getting the Access and Mobility Subscription data from the UDM.

For an Emergency Registration in which the UE was not successfully authenticated, the AMF shall not register with the UDM.

For an Emergency Registration, the AMF shall not check for access restrictions, regional restrictions or subscription restrictions. For an Emergency Registration, the AMF shall ignore any unsuccessful registration response from UDM and continue with the Registration procedure.

14c. When the UDM stores the associated Access Type (e.g. 3GPP) together with the serving AMF as indicated in step 14a, it will cause the UDM to initiate a Nudm_UEC-M_DeregistrationNotification (see clause 5.2.3.2.2) to the old AMF corresponding to the same (e.g. 3GPP) access, if one exists. The old AMF removes the MM context of the UE. If the serving NF removal reason indicated by the UDM is Initial Registration, then, as described in clause 4.2.2.3.2, the old AMF invokes the Nsmf_PDUSession_ReleaseSMContext (SUPI, PDU Session ID) service operation towards all the associated SMF(s) of the UE to notify that the UE is deregistered from old AMF. The SMF(s) shall release the PDU Session on getting this notification.

14d. The Old AMF unsubscribes with the UDM for subscription data using Nudm_SDM_unsubscribe.

15. If the AMF decides to initiate PCF communication, e.g. the AMF has not yet obtained Access and Mobility policy for the UE or if the Access and Mobility policy in the AMF are no longer valid, the AMF selects a PCF.

If the new AMF receives a PCF ID included in UE context from the old AMF in step 5 and successfully contacts the PCF identified by the PCF ID, the AMF may select the (V-)PCF identified by the PCF ID.

If the PCF identified by the PCF ID cannot be used (e.g. no response from the PCF) or there is no PCF ID received from the old AMF in step 5, the AMF selects a (V)-PCF and may select an H-PCF (for roaming scenario) as described in TS 23.501 [2], clause 6.3.7.1 and according to the V-NRF to H-NRF interaction described in clause 4.3.2.2.3.3.

16. [Optional] new AMF performs a Policy Association Establishment as defined in clause 4.16.1.2. For an Emergency Registration, this step is skipped.

If the new AMF contacts the PCF identified by the (V-)PCF ID received during inter-AMF mobility in step 5, the new AMF shall include the (V-) PCF ID in the Npcf_AMPolicyControl Get operation. This indication is not included by the AMF during initial registration procedure.

If the AMF notifies the Mobility Restrictions (e.g. UE location) to the PCF for adjustment, or if the PCF updates the Mobility Restrictions itself due to some conditions (e.g. application in use, time and date), the PCF shall provide the updated Mobility Restrictions to the AMF.

17. The PCF may invoke Namf_EventExposure_Subscribe service operation for UE event subscription.

18. [Conditional] AMF to SMF: Nsmf_PDUSession_UpdateSMContext( ).

For an Emergency Registered UE, this step is applied when the Registration Type is Mobility Registration Update.

The AMF invokes the Nsmf_PDUSession_UpdateSMContext (see clause 5.2.8.2.6) in the following scenario(s):

If the "List Of PDU Sessions To Be Activated" is included in the Registration Request in step 1, the AMF sends Nsmf_PDUSession_UpdateSMContext Request to SMF(s) associated with the PDU Session(s) in order to activate User Plane connections of these PDU Session(s). Steps from step 5 onwards described in clause 4.2.3.2 are executed to complete the User Plane connection activation without sending MM NAS Service Accept from the AMF to (R)AN described in step 12 of clause 4.2.3.2.

when the serving AMF has changed, the new serving AMF notifies the SMF for each PDU Session that it has taken over the responsibility of the signalling path towards the UE: the new serving AMF invokes the Nsmf_PDUSession_UpdateSMContext service operation using SMF information received from the old AMF at step 5. It also indicates whether the PDU Session is to be re-activated.

Steps from step 5 onwards described in clause 4.2.3.2 are executed. In the case that the intermediate UPF insertion, removal, or change is performed for the PDU Session(s) not included in "PDU Session(s) to be re-activated", the procedure is performed without N11 and N2 interactions to update the N3 user plane between (R)AN and 5GC.

The AMF invokes the Nsmf_PDUSession_ReleaseSMContext service operation towards the SMF in the following scenario:

If any PDU Session status indicates that it is released at the UE, the AMF invokes the Nsmf_PDUSession_ReleaseSMContext service operation towards the SMF in order to release any network resources related to the PDU Session. If the serving AMF is changed, the new AMF shall wait until step 18 is finished with all the SMFs associated with the UE. Otherwise, steps 19 to 22 can continue in parallel to this step.

19. New AMF to N3IWF: N2 AMF Mobility Request ( ).

If the AMF has changed and the old AMF has indicated an existing NGAP UE association towards a N3IWF, the new AMF creates an NGAP UE association towards the N3IWF to which the UE is connected. This automatically releases the existing NGAP UE association between the old AMF and the N3IWF 20. N3IWF to new AMF: N2 AMF Mobility Response ( ).

21. [Conditional] old AMF to (V-)PCF: AMF-Initiated Policy Association Termination.

If the old AMF previously initiated a Policy Association to the PCF, and the old AMF did not transfer the PCF ID to the new AMF (e.g. new AMF is in different PLMN), the old AMF performs an AMF-initiated Policy Association Termination procedure, as defined in clause 4.16.3.2, to delete the association with the PCF.

22. New AMF to UE: Registration Accept (5G-GUTI, Registration Area, Mobility restrictions, PDU Session status, Allowed NSSAI, [Mapping Of Allowed NSSAI], [Configured NSSAI for the Serving PLMN], [Mapping Of Configured NSSAI], Periodic Registration Update timer, LADN Information and accepted MICO mode, IMS Voice over PS session supported Indication, Emergency Service Support indicator, Accepted DRX parameters, Network support of Interworking without N26).

The AMF sends a Registration Accept message to the UE indicating that the Registration Request has been accepted. 5G-GUTI is included if the AMF allocates a new 5G-GUTI. If the AMF allocates a new Registration area, it shall send the Registration area to the UE via Registration Accept message. If there is no Registration area included in the Registration Accept message, the UE shall consider the old Registration Area as valid. Mobility Restrictions is included in case mobility restrictions applies for the UE and Registration Type is not Emergency Registration. The AMF indicates the established PDU Sessions to the UE in the PDU Session status. The UE removes locally any internal resources related to PDU Sessions that are not marked as established in the received PDU Session status. If the AMF invokes the Nsmf_PDUSession_UpdateSMContext procedure for UP activation of PDU Session(s) in step 18 and receives rejection from the SMF, then the AMF indicates to the UE the PDU Session ID and the cause why the User Plane resources were not activated. When the UE is connected to the two AMFs belonging to different PLMN via 3GPP access and non-3GPP access then the UE removes locally any internal resources related to the PDU Session of the current PLMN that are not marked as established in received PDU Session status. If the PDU Session status information was in the Registration Request, the AMF shall indicate the PDU Session status to the UE. The Mapping Of Allowed NSSAI is the mapping of each S-NSSAI of the Allowed NSSAI to the S-NSSAIs of the Configured NSSAI for the HPLMN. The Mapping Of Configured NSSAI is the mapping of each S-NSSAI of the Configured NSSAI for the Serving PLMN to the S-NSSAIs of the Configured NSSAI for the HPLMN. The AMF shall include in the Registration Accept message the LADN Information for LADNs, defined in TS 23.501 [2] clause 5.6.5, that are available within the Registration area determined by the AMF for the UE. If the UE included MICO mode in the request, then AMF responds whether MICO mode should be used. The AMF sets the IMS Voice over PS session supported Indication as described in clause 5.16.3.2 of TS 23.501 [2]. In order to set the IMS Voice over PS session supported Indication the AMF may need to perform the UE/RAN Radio information and Compatibility Request procedure in clause 4.2.8 to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage. The Emergency Service Support indicator informs the UE that emergency services are supported, i.e. the UE is allowed to request PDU Session for emergency services. The Accepted DRX parameters are defined in clause 5.4.5 of TS 23.501 [2]. The AMF sets the Interworking without N26 parameter as described in clause 5.17.2.3.1 of TS 23.501 [2].

The Handover Restriction List and UE-AMBR are provided to NG-RAN by AMF in this step.

23. [Conditional] UE to new AMF: Registration Complete ( ).

The UE sends a Registration Complete message to the AMF to acknowledge if a new 5G-GUTI was assigned.

When the "PDU Session(s) to be re-activated" is not included in the Registration Request, the AMF releases the signalling connection with UE, according to clause 4.2.6.

When the Follow on request is included in the Registration Request, the AMF should not release the signalling connection after the completion of the Registration procedure.

If the AMF is aware that some signalling is pending in the AMF or between the UE and the 5GC, the AMF should not release the signalling connection immediately after the completion of the Registration procedure.

The mobility related event notifications towards the NF consumers are triggered at the end of this procedure for cases as described in clause 4.15.4.

Figure 2:
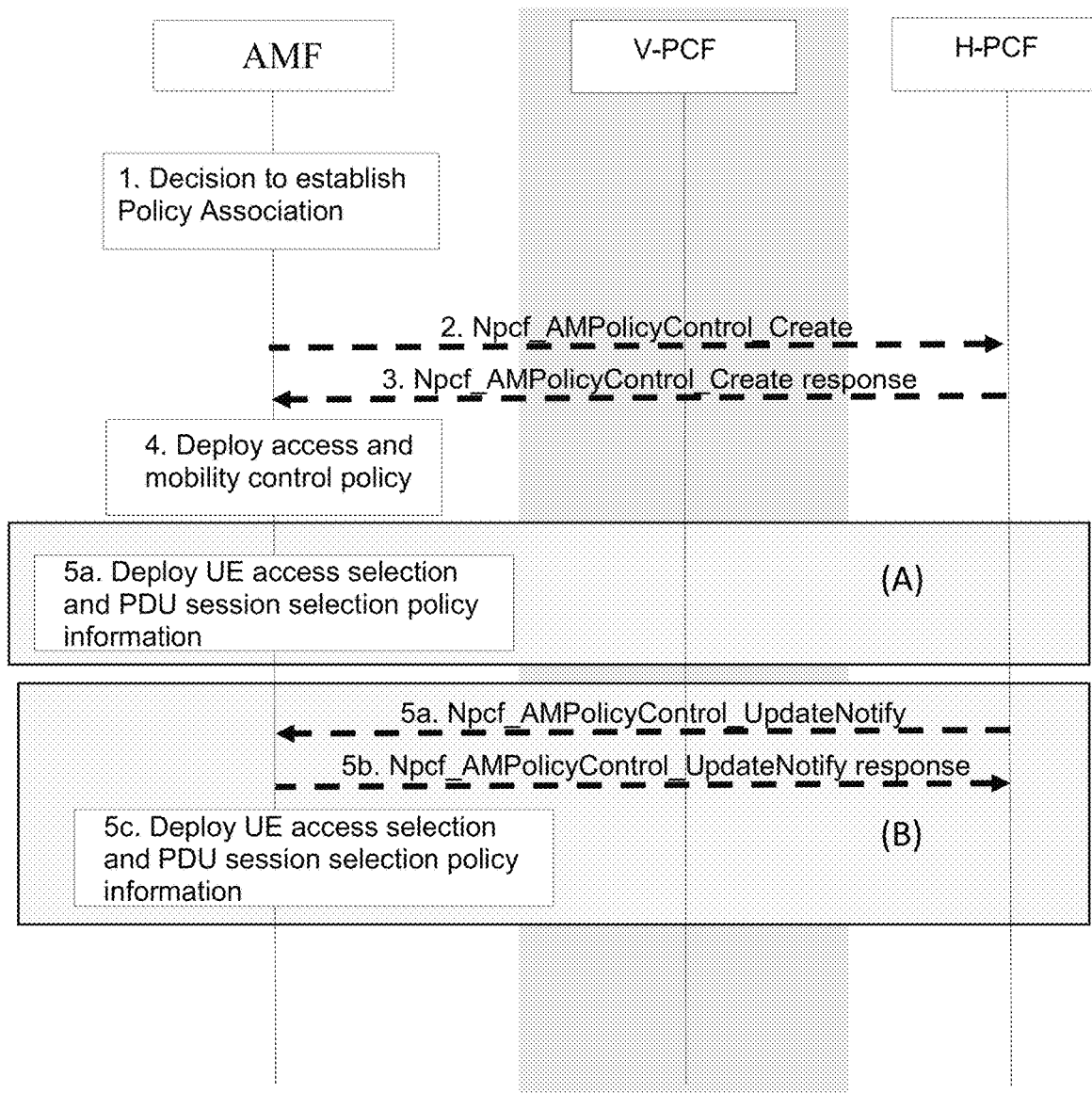
FIG. 2 is a diagram of Access and Mobility (AM) Policy Association Establishment with new Selected Policy Control Function (PCF) in accordance with one or more embodiments.

Referring now to FIG. 2, a diagram of Access and Mobility (AM) Policy Association Establishment with new Selected Policy Control Function (PCF) in accordance with one or more embodiments will be discussed. 3GPP TS 23.503 Section 4.16.1.2 discusses AM Policy Association Establishment with new Selected PCF as follows.

This procedure concerns the following scenarios:

1. UE initial registration with the network.
2. The AMF re-allocation with PCF change in handover procedure and registration procedure.

This procedure concerns both roaming and non-roaming scenarios.

In the non-roaming case the V-PCF is not involved and the role of the H-PCF is performed by the PCF. For the roaming scenarios, the V-PCF interacts with the AMF:

1. Based on local policies, the AMF decides to establish AM Policy Association with the (V-)PCF then steps 2 to 3 are performed under the conditions described below.

2. [Conditional] If the AMF has not yet obtained Access and Mobility policy for the UE or if the Access and Mobility policy in the AMF are no longer valid, the AMF requests the PCF to apply operator policies for the UE from the PCF. The AMF sends Npcf_AMPolicyControl_Create to the (V-)PCF to establish an AM policy control association with the (V-)PCF. The request includes the following information: SUPI, Internal Group (see clause 5.9.7 of TS 23.501 [2]), subscription notification indication and, if available, Service Area Restrictions, RFSP index, GPSI which are retrieved from the UDM during the update location procedure, and may include Access Type and RAT, PEI, ULI, UE time zone, Serving Network and UE access selection and PDU session selection information, including the list of stored PSIs. In roaming scenario, based on operator policies, the AMF may provide to the V-PCF the PCF ID of the selected H-PCF. The V-PCF contacts the H-PCF.

NOTE 1: The UE provides the list of PSIs that are currently stored in the UE (UE access selection and PDU session related policies pre-configured in the UE are not included in this message).

3. The (H-)PCF gets policy subscription related information and the latest list of PSIs if either or both are not available from the UDR using NudrDM_Query (SUPI, Policy Data, UE context policy control) service operation and makes a policy decision. In roaming scenario, the H-PCF responds to the V-PCF, then the (V-)PCF responds to the Npcf_AMPolicyControl_Create service operation, and provides to the AMF the Access and mobility related policy information as defined in clause 6.5 of TS 23.503 [20], UE access selection and PDU Session selection related policy information clause 6.6 of TS 23.503 [20] (optionally) and the Policy Control Request Trigger parameters. In addition, the V-PCF may adjust Access and mobility related policy information (eg. Service Area Restrictions).

The AMF is implicitly subscribed in the PCF to be notified of changes in the policies.

The PCF compares the list of PSIs included in the UE access selection and PDU session selection information, received from the UE with the result of the policy decision to determine whether UE access selection and PDU Session selection policy information have to be included in the answer to the AMF.

If the UE indicates that it only supports preconfigured ANDSP/URSP or it doesn't support ANDSP/URSP, the PCF shall not send the ANDSP/URSP to UE. Alternatively, only when the UE indicates it support ANDSP/URSP provisioned by PCF, the PCF shall send the ANDSP/URSP to UE.

The PCF checks the latest list of PSIs to decide whether and which UE access selection and/or PDU Session selection policies have to be sent to the UE. If UE access selection and PDU Session selection policies have to be sent to the UE, the PCF checks if the size of these policies exceeds a predefined limit:

NOTE 2: NAS messages from AMF to UE do not exceed the maximum size limit allowed in NG-RAN (PDCP layer), so the predefined size limit in PCF is related to that limitation.

If the size is under the limit then the UE access selection and PDU Session selection policy information is included in the answer of Npcf_AMPolicyControl_Create service operation.

If the size exceeds the predefined limit the PCF does not include UE access selection and PDU Session selection policy information in the answer and splits this information in smaller logical independent UE access selection and PDU Session selection policy information and ensuring the size of each is under the predefined limit. Each UE access selection and PDU Session selection policy information will be then sent in additional Npcf_AMPolicyControl_UpdateNotify service operations as described in steps in 5(B).

NOTE 3: The mechanism used to split the UE access selection and PDU Session selection policy information is described in TS 29.507 [32].

The PCF may request notifications from the UDR on changes in the subscription information by invoking Nudr_DM_Subscribe (SUPI, Policy Data, Notification Target Address (+ Notification Correlation Id), Event Reporting Information (continuous reporting), UE context policy control) service.

4. [Conditional] The AMF deploys the Access and mobility related policy information which includes storing the Service Area Restrictions, provisioning the UE access selection and PDU Session selection related policy information and Service Area Restrictions to the UE and provisioning the RFSP index and Service Area Restrictions to the NG-RAN as defined in TS 23.501 [2].

5(A). If the PCF included UE access selection and PDU Session selection policy information in the answer of Npcf_AMPolicyControl_Create service operation in step 3, the AMF deploys the UE access selection and PDU selection policy information to the UE using UE Update Delivery procedure as described in clause 4.2.4.3. This UE access selection and PDU Session selection policy information indicates a new set of UE access selection and PDU Session selection policy to be added in UE or to delete/modify an existing set of UE access selection and PDU Session selection policy in UE.

The PCF maintains the latest list of UE access selection and PDU Session related information delivered to the UE updated in step 6 and updates the latest list of PSIs in the UDR by invoking Nudr_DM_Update service operation.

Step 5(B) is skipped.

5(B). If the PCF applied splitting in step 3 it sends Npcf_AMPolicyControl_UpdateNotify service operation to the AMF including one UE access selection and PDU Session selection policy information (step 5a).

The AMF stores the information and acknowledges the operation (step 5b). This UE access selection and PDU Session selection policy information indicates a new set of UE access selection and PDU Session selection policy to be added in UE or to delete/modify an existing set of UE access selection and PDU Session selection policy in UE.

The PCF maintains the latest list of UE access selection and PDU Session related information delivered to the UE updated in step 6 and updates the latest list of PSIs in the UDR by invoking Nudr_DM_Update service operation.

The AMF deploys the UE access selection and PDU selection policy information to the UE using UE Policy delivery procedure as described in clause 4.2.4.3.

NOTE 4: The AMF handles transparently the UE access selection and PDU Session selection policy information received from the PCF.

NOTE 5: After this step the PCF can subscribe to AMF events for the UE.

The changes to 3GPP TS 23.503 are discussed below.

6.1.2.2 UE access selection and PDU Session selection related policy (UE policy) control.

6.1.2.2.1 General

The 5GC shall be able to provide policy information from the PCF to the UE. Such policy information includes:

1) Access Network Discovery & Selection Policy (ANDSP): It is used by the UE for selecting non-3GPP accesses. The structure and the content of this policy are specified in clause 6.6.1.

2) UE Route Selection Policy (URSP): This policy is used by the UE to determine if a detected application can be associated to an established PDU Session, can be offloaded to non-3GPP access outside a PDU Session, or can trigger the establishment of a new PDU Session. The structure and the content of this policy are specified in clause 6.6.2. The URSP rules include traffic descriptors that specify the matching criteria and one or more of the following components:

2a) SSC Mode Selection Policy (SSCMSP): This is used by the UE to associate the matching application with SSC modes.

2b) Network Slice Selection Policy (NSSP): This is used by the UE to associate the matching application with S-NSSAI.

2c) DNN Selection Policy: This is used by the UE to associate the matching application with DNN.

2d) Non-seamless Offload Policy: This is used by the UE to determine that the matching application should be non-seamlessly offloaded to non-3GPP access (i.e. outside of a PDU Session).

2e) Access Type preference: If the UE needs to establish a PDU Session for the matching application, this indicates the preferred Access Type (3GPP or non-3GPP).

The ANDSP and URSP may be pre-configured in the UE. Additionally, if supported by the UE, ANDSP and URSP may be provisioned to UE from PCF. The pre-configured policy shall be applied by the UE only when it has not received the same type of policy from PCF.

The PCF selects the ANDSP and URSP applicable for each UE based on local configuration and operator policies taking into consideration e.g. accumulated usage, load level information per network slice instance, UE location.

In the case of a roaming UE, the V-PCF may retrieve ANDSP and URSP from the H-PCF over N24/Npcf.

The ANDSP and URSP shall be provided from the PCF to the AMF via N15/Npcf interface and then from AMF to the UE via the N1 interface. The AMF shall not change the ANDSP and the URSP provided by PCF.

When the UE has valid USRP rules, the UE shall perform the association based on user preference and these rules. URSP is only applied when there is no applicable user preference for the matching application.

If there are multiple IPv6 prefixes within the PDU Session, then the routing rules, described in clause 5.8.1.2 in 3GPP TS 23.501 [2], on the UE shall be used to select which IPv6 prefix to route the traffic of the application.

6.1.2.2.2 Distribution of the Policies to UE

The UE access selection and PDU Session related policy control policy control enables the PCF to provide UE access selection and PDU Session related policy information to the UE, i.e. UE policies, that includes either Access network discovery & selection policy (ANDSP) or UE Route Selection Policy (URSP) or both using Npcf and Namf service operations.

The PCF may provide the UE access selection and PDU Session related policy information at the initial Registration procedure, or when the operator policies indicate that the conditions for updating the UE are met, i.e. at change of UE location or at mobility with change the AMF, or at any time, as defined in TS 23.502 [3]. Operator defined policies in the PCF may depend on input data such as UE location, time of day, information provided by other NFs, etc as defined in clause 6.2.1.2.

The PCF ensures that UE access selection and PDU Session related policy information delivered to the AMF, is under a predefined size limit. If this predefined limit is exceeded then PCF provides a list of self-contained UE access selection and PDU Session related policy information to the UE, via AMF. The PCF delivers to the UE transparently via the AMF.

The PCF may divide the UE access selection and PDU Session related policy information into different policy sections, each identified by a Policy Clause Identifier (i.e. PSI). It is up to PCF decision how to divide the UE access selection and PDU Session related policy information into policy sections.

NOTE 1: PCF may, for example, assign the URSP as one whole policy section, or it may subdivide the information in the URSP into multiple policy sections by assigning one or several URSP rules to each policy section.

When providing the UE with UE access selection and PDU Session related policy information, the PCF shall provide the Policy Clause Identifiers (PSI) policy sections.

The AMF forwards the UE access selection and PDU Session related policy information to the UE. The UE updates the stored UE access selection and PDU Session selection policies by the one provided by the PCF as follows:
 If the UE has no policies with the same PSI, the UE stores the PSI and the corresponding policy information;
 If the UE has existing policies with the same PSI, the UE replaces the stored policy information with the received information;
 The UE may remove the stored PSI entry if the received information content is empty.

NOTE 2: The AMF does not need to understand the content of the UE policy, rather send them to the UE for storage.

At Initial Registration the UE provides the list of stored PSIs identifying the policy sections that are currently stored in the UE, if no policies are stored in the UE, UE does not provide any PSI. The UE may use some specific PSI value to indicate whether it only supports preconfigured ANDSP/URSP or it doesn't support ANDSP/URSP, or it only supports ANDSP/URSP provisioned by PCF. When receiving indication of UE only supporting preconfigured ANDSP/URSP or UE not supporting ANDSP/URSP, the PCF shall not send the corresponding policy to UE. Alternatively, only when the UE indicates it support ANDSP/URSP provisioned by PCF, the PCF shall send the ANDSP/URSP to UE. The AMF provides the UE access selection and PDU Session related policy information to PCF in the Npcf_AMPolicyControl_Get procedure.

NOTE 3: The specific PSI values are to be specified by stage 3.

The UE may trigger an Initial registration with the UE Policy Info to request a synchronization of UE policies for example in the following scenarios:
 if the UE powers up for the first time and has no policies;
 if the USIM is moved from one device to another.

When the PCF receives Npcf_AMPolicyControl_Get then it retrieves the list of PSIs and its content stored in the UDR for this SUPI. The PCF compares the two lists of PSIs, in addition the PCF checks whether the list of PSIs and its content needs to be updated according to operator policies. If the two list of PSIs are different or an update is necessary, the PCF provide an updated list of PSIs and corresponding policy contents to the AMF in the Npcf_AMPolicyControl_Get Response. In case the PCF decides to spit the policies to be sent to the UE, the PCF uses Npcf_AMPolicyControl_UpdateNotify service and then AMF uses using UE configuration Update procedure for transparent UE policies delivery procedure to deliver the policies to the UE.

The PCF maintains the latest list of UE access selection and PDU Session related information delivered to each UE as part of the information related to the Policy Association until the Npcf_AMPolicyControl Delete is received from the AMF. Then PCF stores the latest list of PSIs and its contents in the UDR using the Nudr_UDM_Update including DataSet "Policy Data" and Data Subset "Policy Set Entry".

NOTE 4: The PCF ensures that the PSIs provided by H-PLMN and V-PLMN(s) do not overlap.

NOTE 5: The UE doesn't provide to the PCF the list of pre-configured UE access selection and PDU session related policy information stored in the UE.

NOTE 6: The size limit to allow the policy information to be delivered using NAS transport is specified in TS 29.507 [13]. The size limit is configured in the PCF.

6.6 UE access selection and PDU Session selection related policy information 6.6.1 Access Network Discovery & Selection Policy Information 6.6.1.1 General The Access Network Discovery & Selection policy is an optional policy that may be provided to UE by the network, if provisioning via signalling is supported by the UE.

In this release of the specification, the Access Network Discovery & Selection policy shall contain only rules that aid the UE in selecting a WLAN access network. Rules for selecting other types of non-3GPP access networks are not specified.

The WLAN access network selected by the UE with the use of Access Network Discovery & Selection policy may be used for direct traffic offload (i.e. sending traffic to the WLAN outside of a PDU Session) and for registering to 5GC via a N3IWF.

The Access Network Discovery & Selection policy shall contain one or more WLAN Selection Policy (WLANSP) rules defined in section 4.8.2.1.6 of 3GPP TS 23.402 [9].

TABLE 6.6.1-1

Access Network Discovery & Selection Policy

| Information name | Description | Category | PCF permitted to modify in a UE context | Scope |
|---|---|---|---|---|
| WLANSP rules | 1 or more WLANSP rules as specified in 4.8.2.1.6 of TS 23.402 [9] | Mandatory | Yes | UE context |

6.6.1.2 UE Selecting a WLANSP Rule

The UE may be provisioned with multiple valid WLANSP rules (by the HPLMN and by the VPLMN when the UE is roaming), if provisioning via signalling is supported by the UE. A WLANSP rule is valid if it meets the validity conditions included in the WLANSP rule (if provided).

When the UE is in the home the UE uses the valid WLANSP rules from the home PLMN to select an available WLAN. When the UE is roaming and the UE has valid rules from both HPLMN and VPLMN the UE gives priority to the valid WLANSP rules from the VPLMN.

6.6.2.2 Configuration and Provision of URSP

The UE may be pre-configured with URSP rules (e.g. by the operator). Additionally, if supported by the UE, it may be provisioned with URSP rules by PCF of the HPLMN. When the UE is roaming, the PCF in the HPLMN may update the URSP rule in the UE. The URSP rules provisioned by the PCF take precedence over the pre-configured URSP rules, if both are present.

Figure 3:
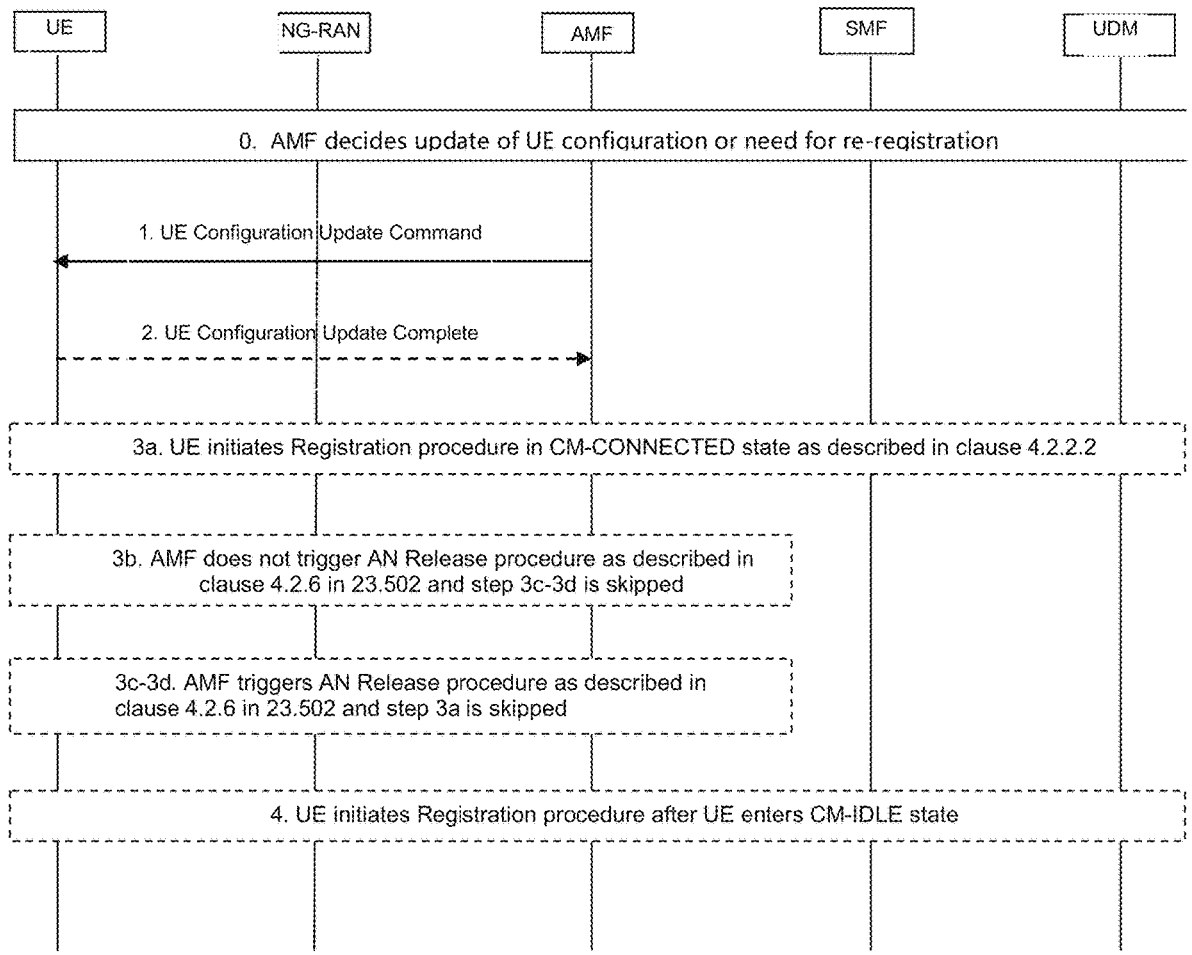
FIG. 3 is a diagram of a UE Configuration Update procedure for access and mobility management related parameters in accordance with one or more embodiments.

Referring now to FIG. 3, a diagram of a UE Configuration Update procedure for access and mobility management related parameters in accordance with one or more embodiments will be discussed.

In one or more embodiments, a graceful re-register time can be used which will be sent to UE in the UE Configuration Update Command along with the changed Allowed NSSAI, the UE should notify the user about the graceful re-register time to remind the user to end the important ongoing service within the graceful re-register time. The UE will start a re-register timer which value equals to the graceful re-register time, when the timer expires, the UE will do re-register. At the same time, the AMF will start a NAS Signalling connection release timer which value equals to or bigger than the graceful re-register time, when this timer expires, the AMF will force the UE to enter CM-IDLE by releasing the NAS Signalling connection, thus UE can do re-register in CM-IDLE state.

This procedure is initiated by the AMF when the AMF wants to update access and mobility management related parameters in the UE configuration. The procedure applies only to information in the UE that does not require negotiation between the UE and the network.

This procedure is also used to trigger UE to perform, based on network indication, either Registration Update procedure while the UE is in CM-CONNECTED state to modify parameters that require negotiation (e.g. MICO mode) or Registration Update procedure after the UE enters CM-IDLE state (e.g. for changes to Allowed NSSAI that require re-registration).

If the AMF wants to update NAS parameters in the UE which require UE acknowledgement, then the AMF provides an indication to the UE of whether the UE shall acknowledge the command or not. The AMF should not request acknowledgement of the NITZ command. The AMF shall request acknowledgement for NSSAI information (e.g. Allowed NSSAI), 5G-GUTI, TAI List, and Mobility Restrictions.

0. AMF determines the necessity of UE configuration change due to various reasons (e.g. UE mobility change, NW policy, reception of Subscriber Data Update Notification from UDM, change of Network Slice configuration) or that the UE needs to perform a Registration Procedure. If a UE is in CM-IDLE, the AMF triggers Network Triggered Service Request (in clause 4.2.3.4).

1. The AMF may include Handover Restriction List in N2 message that delivers UE Configuration Update command to the UE if the service area restriction for the UE is updated.

1. The AMF sends UE Configuration Update command containing one or more UE parameters (5G-GUTI, TAI List, Allowed NSSAI, Mapping Of Allowed NSSAI, Configured NSSAI for the Serving PLMN, Mapping Of Configured NSSAI, NITZ, Mobility Restrictions, LADN Information, MICO, Configuration Update Indication, graceful re-register time) to UE.

The AMF includes one or more of 5G-GUTI, TAI List, Allowed NSSAI, Mapping Of Allowed NSSAI, Configured NSSAI for the Serving PLMN, Mapping Of Configured NSSAI, NITZ (Network Identity and Time Zone), Mobility Restrictions parameters or LADN Information if the AMF wants to update these NAS parameters without triggering a UE Registration procedure.

The AMF may include in the UE Configuration Update Command also a Configuration Update Indication parameter indicating whether:
  the UE shall acknowledge the command and,
  a Registration procedure is requested.

For the latter case, the AMF may additionally indicate that the UE whether the 5G-GUTI shall be used in access stratum signalling for the Registration procedure.

2. If the UE Configuration Update Indication requires acknowledgement of the UE Configuration Update Command, then the UE shall send a UE Configuration Update complete message to the AMF. The AMF should request acknowledgement for all UE Configuration Updates, except for NITZ.

If the Configuration Update Indication requires a Registration procedure, depending on the parameters included in the UE Configuration Update command steps 3a or 3b-4 or 3c-3d-4 are executed.

3a. If MICO is included in the UE Configuration Update Command message, UE shall initiate a Registration procedure immediately after the acknowledgement to re-negotiate MICO mode with the network. Steps 3b, 3c, 3d and step 4 are skipped.

3b. If a new Allowed NSSAI and/or a new Configured NSSAI provided by the AMF to the UE does not affect the existing connectivity to slices (i.e. any S-NSSAI(s) the UE is connected to), the AMF needs not release the NAS signalling connection for the UE after receiving the acknowledgement in step 2, and immediate-registration is not required. The UE cannot connect to an S-NSSAI included in the Configured NSSAI for the Serving PLMN but not included in the current Allowed NSSAI until the UE performs a Registration procedure and includes a Requested NSSAI based on the new Allowed NSSAI. Steps 3c and 3d are skipped.

3c. If a new Allowed NSSAI and/or a new Configured NSSAI provided by the AMF to the UE affects ongoing existing connectivity to slices, then the AMF also includes in the UE Configuration Update Command message an Allowed NSSAI with the associated mapping of Allowed NSSAI, and an indication that the UE shall not provide the 5G-GUTI in Access Stratum signalling when performing a Registration procedure. In order not to interrupt the ongoing important service (e.g. Emergency Service, IMS voice, etc.) brutally, a graceful re-register time is included in the UE Configuration Update Command message, which allows the UE do re-register when the graceful re-register time expires. The AMF will start a NAS Signalling connection release timer which value equals to or bigger than the graceful re-register time, when this timer expires, the AMF shall release the NAS signalling connection for the UE after receiving the acknowledgement in step 2.

4. UE initiates a Registration procedure after the UE enters CM-IDLE state and includes the 5G-GUTI in Access Stratum signalling depending on the indication received from the AMF.

NOTE: Receiving UE Configuration Update command without an indication requesting to perform re-registration, can still trigger Registration Update procedure by the UE for other reasons.

Figure 4:
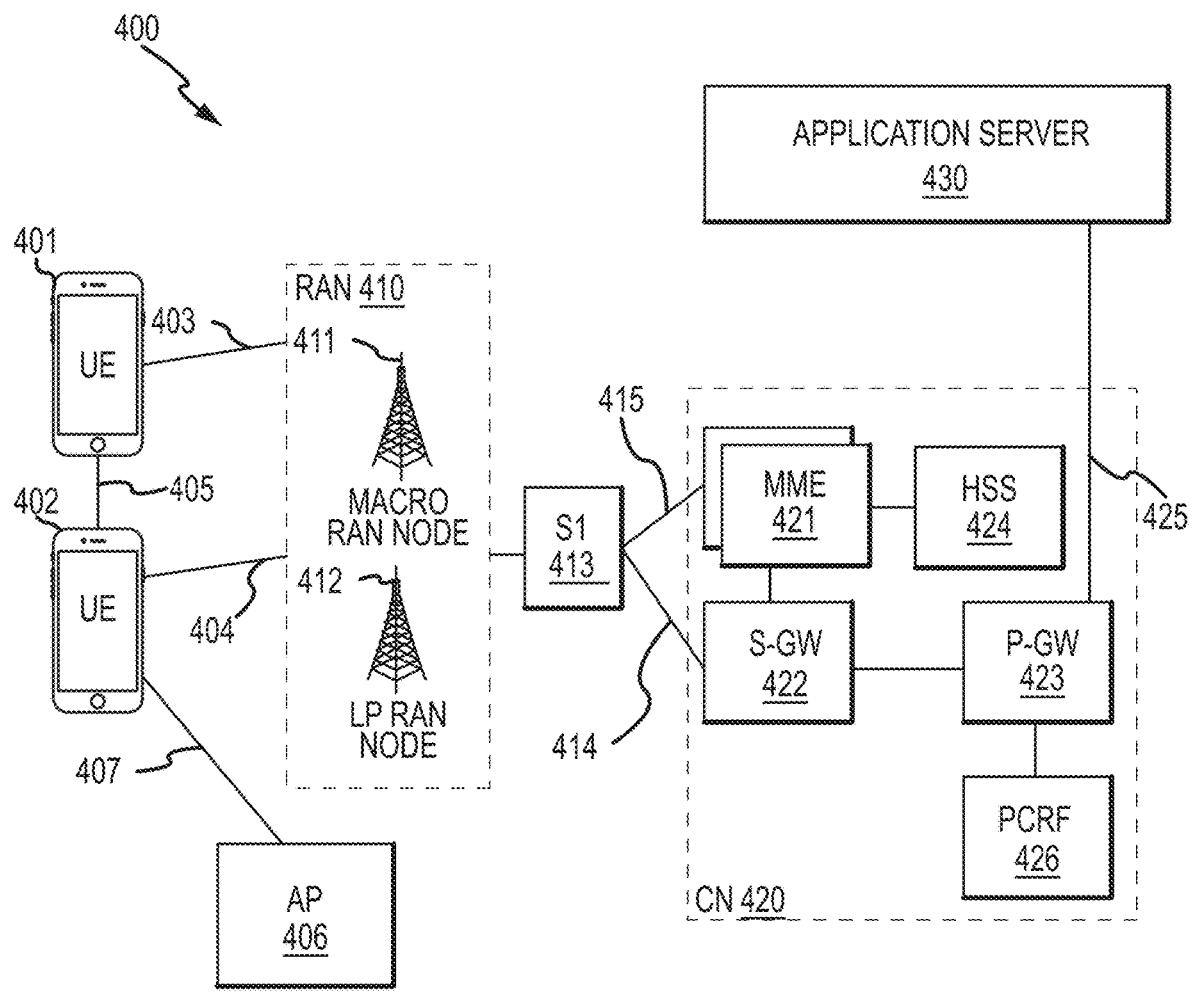
FIG. 4 illustrates an architecture of a system of a network in accordance with some embodiments.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
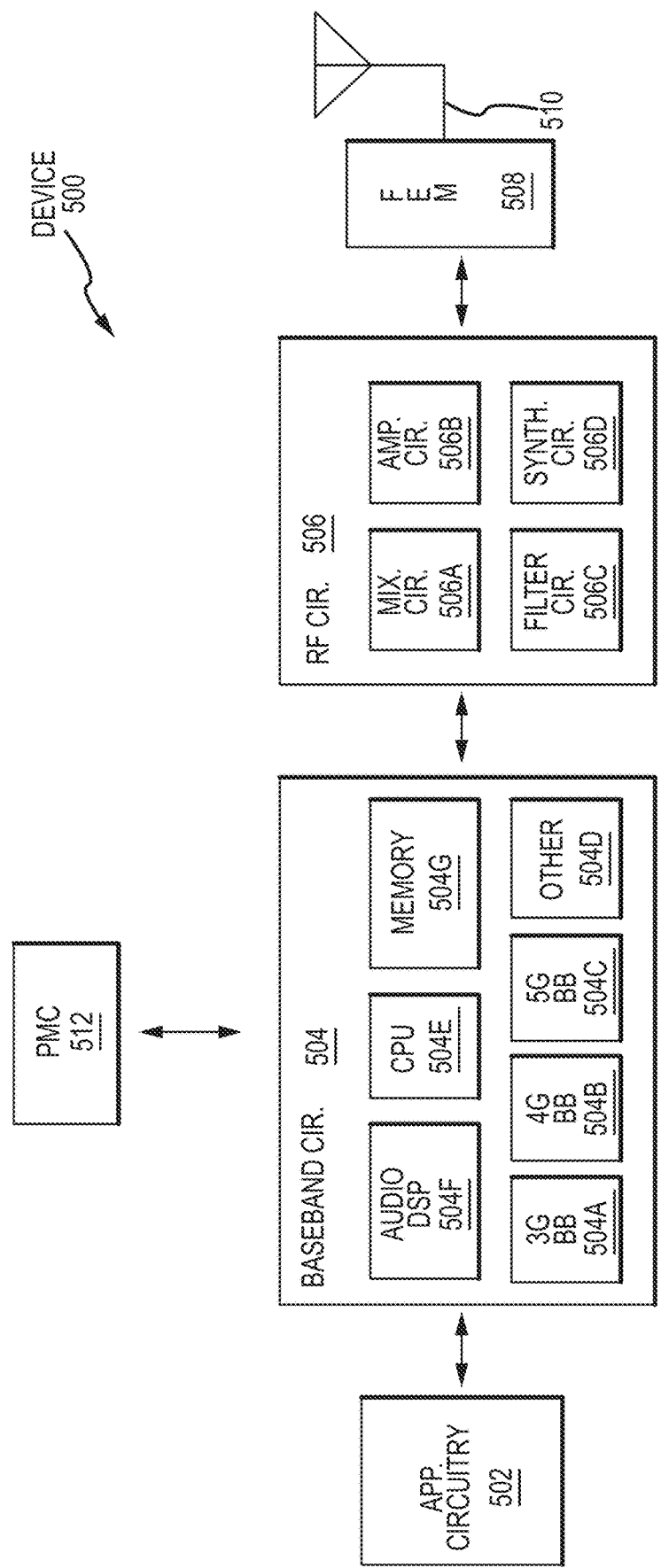
FIG. 5 illustrates example components of a device 500 in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect. In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage-controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
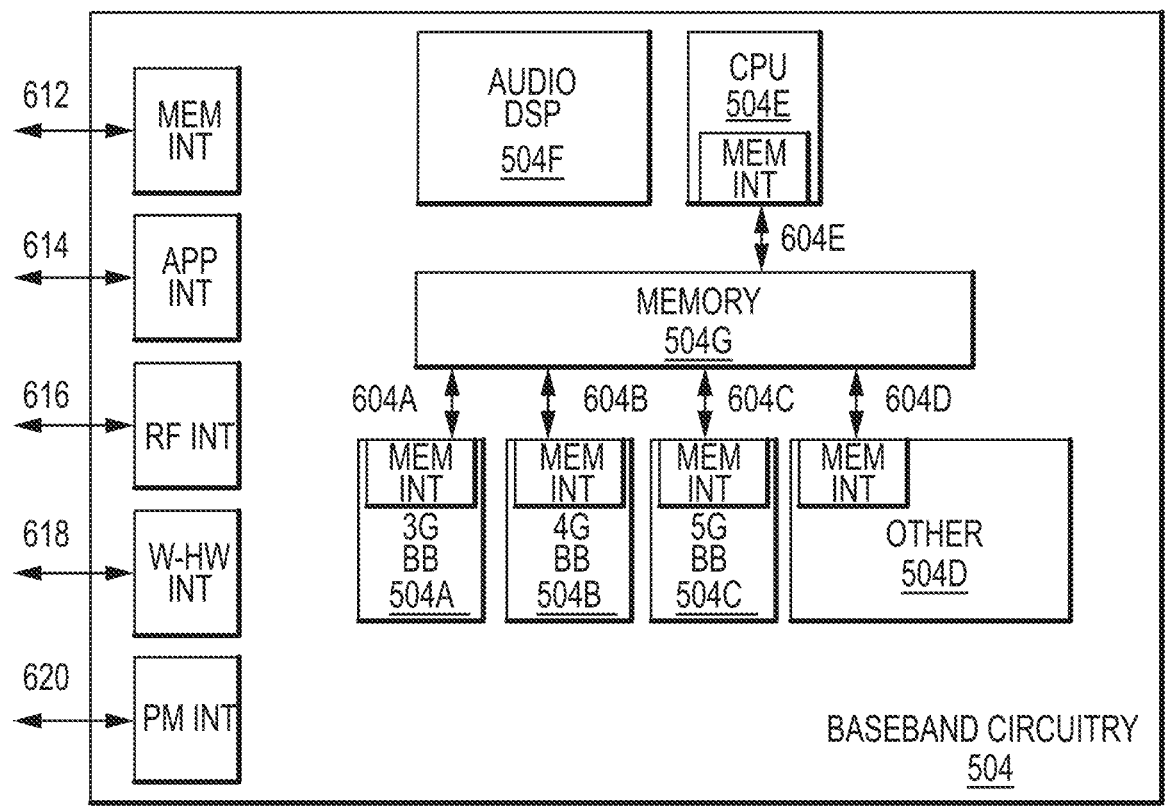
FIG. 6 illustrates example interfaces of baseband circuitry in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Although the claimed subject matter has been described with a certain degree of particularity, it should be recognized that elements thereof may be altered by persons skilled in the art without departing from the spirit and/or scope of claimed subject matter. It is believed that the subject matter pertaining to a user equipment (UE) providing an indication to a policy control function (PCF) whether or not to send UE policy and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
   one or more baseband processors to encode a UE capability indicator to be transmitted to a policy control function (PCF) via an Access and Mobility Management Function (AMF), wherein the UE capability indicator indicates whether the UE supports or does not support a preconfigured UE policy comprising access network discovery and selection policy (ANDSP) or UE route selection policy (URSP), or both; and
   a memory to store the UE capability indicator.

2. The apparatus of claim 1, wherein the UE capability indicator comprises an initial Registration Request message.

3. The apparatus of claim 1, wherein the UE capability indicator comprises one or more specific Policy Session Identifier (PSI) values included in a list of PSIs.

4. The apparatus of claim 1, wherein a default UE capability is indicated when the UE capability indicator does not indicate that the UE supports a specific capability.

5. The apparatus of claim 1, wherein the UE capability indicator comprises a new indicator.

6. The apparatus of claim 1, wherein the UE capability indicator indicates to the PCF support of a higher protocol version for communication between the UE and the PCF.

7. The apparatus of claim 1, wherein support of a higher protocol version includes support of a different format of ANDSP or URSP that is not backwards compatible to a previous version of the protocol.

8. The apparatus of claim 1, wherein the UE capability indicator indicates to the PCF support of configuration via signaling of one or more additional UE policies other than ANDSP or URSP.

9. An apparatus of a policy control function (PCF), comprising:
   one or more baseband processors to decode a user equipment (UE) capability indicator received from a UE via an Access and Mobility Management Function (AMF), wherein the UE capability indicator indicates whether the UE supports or does not support a preconfigured UE policy comprising access network discovery and selection policy (ANDSP) or UE route selection policy (URSP), or both; and
   a memory to store the UE capability indicator.

10. The apparatus of claim 9, wherein the one or more baseband processors are to not send the ANDSP to the UE when the UE indicator indicates that the UE only supports preconfigured ANDSP, and the one or more baseband processors are to not send the URSP to the UE when a Policy Session Identifier (PSI) value received from the UE indicates the UE only supports preconfigured URSP.

11. The apparatus of claim 9, wherein the one or more baseband processors are to use a default UE capability when no UE capability indictor is received from the UE or if the UE capability indicator does not indicate any specific capability.

12. The apparatus of claim 9, wherein the one or more baseband processors are to not send the UE policy to the UE when the UE capability indicator indicates that the UE does not support UE policy.

13. The apparatus of claim 9, wherein the one or more baseband processors are to send a UE policy to the UE when the UE capability indicator indicates that the UE supports UE policy.

14. The apparatus of claim 9, wherein the one or more baseband processors are to not send the ANDSP or URSP in a new format that is not backwards compatible to a format defined in a previous version of a protocol or are not to send the additional policies to the UE when the UE capability indicator does not indicate that the UE supports a higher protocol version or that the UE supports configuration via signaling of one or more policies other than ANDSP or URSP.

15. One or more non-transitory media having instructions stored thereon that, when executed by an apparatus of a user equipment (UE), result in:
   encoding a UE capability indicator for a policy control function (PCF), wherein the UE capability indicator indicates whether the UE supports or does not support a preconfigured UE policy comprising access network discovery and selection policy (ANDSP) or UE route selection policy (URSP), or both; and
   transmitting the UE capability indicator to the PCF via an Access and Mobility Management Function (AMF).

16. The one or more non-transitory media of claim 15, wherein the UE capability indicator comprises an initial Registration Request message.

17. The one or more non-transitory media of claim 15, wherein the UE capability indicator comprises one or more specific Policy Session Identifier (PSI) values included in a list of PSIs.

18. The one or more non-transitory media of claim 15, wherein a default UE capability is indicated when the UE capability indicator does not indicate that the UE supports a specific capability.

19. The one or more non-transitory media of claim 15, wherein the UE capability indicator comprises a new indicator.

20. The one or more non-transitory media of claim 15, wherein the UE capability indicator indicates to the PCF support of a higher protocol version for communication between the UE and the PCF.

* * * * *